J. G. HILL.
SCREW PROPELLER.

No. 181,679. Patented Aug. 29, 1876.

WITNESSES:
C. Neveux
John Goethals

INVENTOR:
J. G. Hill
BY
[signature]
ATTORNEYS.

UNITED STATES PATENT OFFICE.

JOSEPH G. HILL, OF NEWARK, NEW JERSEY.

IMPROVEMENT IN SCREW-PROPELLERS.

Specification forming part of Letters Patent No. 181,679, dated August 29, 1876; application filed February 14, 1876.

*To all whom it may concern:*

Be it known that I, JOSEPH G. HILL, of Newark, Essex county, New Jersey, have invented a new and Improved Propeller, of which the following is a specification:

My invention is a contrivance for constructing the hub in sections, so as to attach blades of rolled plate; and it also consists of a propeller-blade in half or a lesser portion of a circle, and shaped in a true flat plane, instead of the spiral shape heretofore employed, whereby it is believed that better results can be obtained than from the spiral form.

Figure 1:
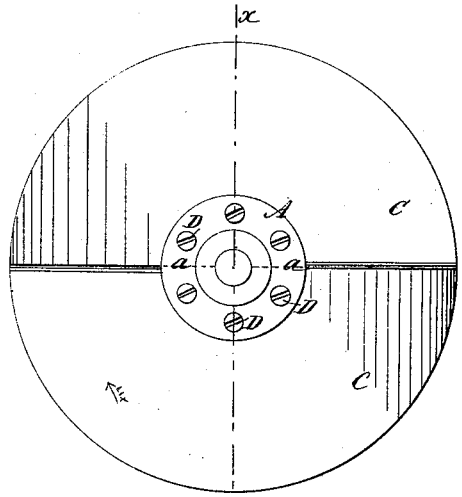
Figure 2:
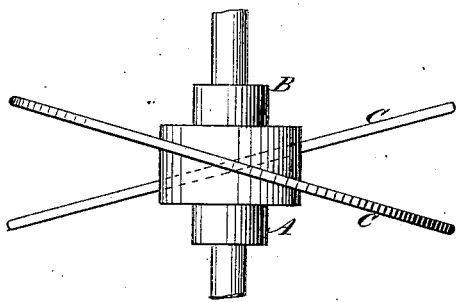
Figure 3:
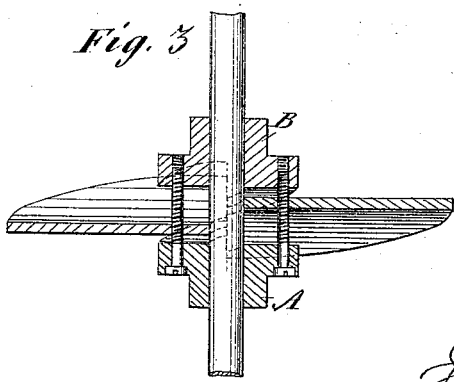

Figure 1 is an end elevation of my improved propeller. Fig. 2 is a top view; and Fig. 3 is a sectional elevation taken on the line $x\ x$, Fig. 1.

Similar letters of reference indicate corresponding parts.

In this example, the hub is represented as being made for two blades, and is made in two sections, A B, which are divided in two oblique planes, corresponding to the planes of the blades C, and two longitudinal planes, represented by the dotted lines in Fig. 1, and corresponding to the lines of the straight edges of the blades, so that said parts are connected together, and the blades are secured to them by the bolts D passing through the hub parallel to the shaft. If three blades are used there will be three of the longitudinal divisions $a$, and more if more blades are used. These longitudinal divisions make shoulders, by which the two parts of the hub interlock, so that the bolts do not have to support the strain of the blades by rotation. Along the diagonal divisions of the hub corresponding to the blades space is provided corresponding to the thickness of the blades between the two parts of the hub.

I propose to make the propeller-blades of the plane flat shape, as represented in the drawing, which I consider to be adapted to give better results, and have less loss by slip, than any other form now in use.

Having thus described my invention, I claim as new and desire to secure by Letters Patent—

A sectional propeller-hub, composed of two parts, A B, divided in the planes of the blades, and two or more longitudinal planes, $a$, and bolted together and to the blades by bolts D, parallel to the shaft, substantially as specified.

JOSEPH G. HILL.

Witnesses:
A. P. THAYER,
ALEX. F. ROBERTS.